United States Patent
Washiro (10) Patent No.: US 9,229,871 B2
(45) Date of Patent: Jan. 5, 2016

(54) CACHE DEVICE, COMMUNICATION APPARATUS, AND COMPUTER PROGRAM PRODUCT

(71) Applicant: YOKOGAWA ELECTRIC CORPORATION, Musashino-shi, Tokyo (JP)

(72) Inventor: Mitsuhiro Washiro, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 364 days.

(21) Appl. No.: 13/742,790

(22) Filed: Jan. 16, 2013

(65) Prior Publication Data

US 2013/0191597 A1    Jul. 25, 2013

(30) Foreign Application Priority Data

Jan. 19, 2012  (JP) .................................. 2012-009137

(51) Int. Cl.
*G06F 12/08*  (2006.01)
*G06F 12/12*  (2006.01)

(52) U.S. Cl.
CPC ........ *G06F 12/0875* (2013.01); *G06F 12/0897* (2013.01); *G06F 12/121* (2013.01)

(58) Field of Classification Search
CPC . G06F 12/0804; G06F 11/108; G06F 3/0688; G06F 12/0866; G06F 11/3471; G06F 11/3485; G06F 2201/885; G06F 2212/222; G06F 3/0613; G06F 3/0656; G06F 12/121; G06F 12/084; G06F 2212/2022; G06F 9/52; G06F 12/0897; G06F 12/0875
USPC ......... 711/113, 118–119, 128, 130, 136, 143, 711/170, E12.017, E12.025, E12.04, 711/E12.018
See application file for complete search history.

(56) References Cited

U.S. PATENT DOCUMENTS

| | | | | |
|---|---|---|---|---|
| 5,606,688 A | * | 2/1997 | McNutt et al. ................ | 711/170 |
| 2006/0206659 A1 | * | 9/2006 | Anne et al. .................... | 711/100 |
| 2011/0022801 A1 | * | 1/2011 | Flynn ............................ | 711/120 |

FOREIGN PATENT DOCUMENTS

| | | | |
|---|---|---|---|
| JP | 2003-333121 A | 11/2003 | |
| JP | 2006-091961 A | 4/2006 | |

* cited by examiner

*Primary Examiner* — Zhuo H Li
(74) *Attorney, Agent, or Firm* — Sughrue Mion, PLLC (57) ABSTRACT

A cache device may include a first storage unit configured to store first cache data, a second storage unit configured to store a cache file that stores copy of the first cache data as second cache data; a reading unit configured to select and read out one of the first cache data, which has been stored in the first storage unit, and the second cache data, which has been stored in the cache file stored in the second storage unit, in response to a reference request from outside, and an instructing unit configured to determine probability of expecting future referencing request based on the frequency of past referencing requests, the instructing unit being configured to instruct that either the first cache data or the second cache data is to be selected and read out based on the probability.

17 Claims, 4 Drawing Sheets

CACHE DEVICE, COMMUNICATION APPARATUS, AND COMPUTER PROGRAM PRODUCT

BACKGROUND OF THE INVENTION

1. Field of the Invention

The present invention relates to a cache device, a communication apparatus, and a computer program product.

Priority is claimed on Japanese Patent Application No. 2012-009137, filed Jan. 19, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in order to implement a high level of automated operation in plants, factories, and the like, distributed control systems (DCSs), in which on-site equipment (measurement instruments and actuators) known as field devices are connected to device management apparatuses that manage and control the field devices via a communication bus have been implemented. In such a distributed control system, cache devices are often used to alleviate delay in data transfer to the minimum possible, and to improve transmission efficiency.

A cache device used in a distributed control system holds device property information obtained from field devices and parameter property information obtained from a DD (device description) file created using a DDS (data description specification) as cache data in a memory such as a RAM (random-access memory) or the like. In this case, the above-noted device property information is a tag indicating the ID (identifier) or name of a field device, the internal field device calculation time period, and information indicating other characteristics of the field device. The above-noted parameter property information is parameters used in the field device (for example, parameters into which measurement results are stored, or parameters for calculations), such as data length, sign, moniker, and information indicating other characteristics.

Specifically, when there is a parameter read or write request to a field device from a host device (for example, a device management apparatus), the above-noted cache device obtains and holds as cache data the device property information and parameter property information required for the execution of processing in response to the request from the field device and the DD file, and executes processing in response to the request. Then, if the same request is received again, by executing the processing in response to the request using device property information and parameter property information that are held as cache data, the time required for obtaining the device property information from the field device and the time required for analyzing the DD file to obtain the parameter property information are eliminated.

Japanese Unexamined Patent Application, First Publication No. 2003-333121 discloses a field device communication apparatus provided between a host device and a controller that controls a field device, which fully asynchronously communicates with a GUI means of the host device and which communicates with the field device via the controller. Additionally, Japanese Unexamined Patent Application, First Publication No. 2006-91961 discloses a communication interface that has a request cache in which a request from a host application is registered and a response cache in which a response from a field device is stored.

As disclosed, for example, in Japanese Unexamined Patent Application, First Publication No. 2006-91961, requests from a host device and responses from a field device are without exception conventionally all held into memory as cache data. For this reason, even information for which there is no expectation of re-referencing is held as cache data in memory, this leading to unnecessary use of memory capacity. In recent years, communication apparatuses connectable to several thousand field devices have become practical and, with such communication apparatuses, a huge amount of memory to hold cache data is required.

Additionally, because responses and the like from the above-described field devices has conventionally been all held as cache data in memory, the maximum number of field devices to which connection could be made in accordance with a capacity of memory is limited. Although it can be envisioned that if an expansion of memory used for the cache is possible, an increase is possible in the maximum number of field devices, the maximum number of field devices cannot be increased if it is not possible to expand the memory.

SUMMARY

A cache device may include: a first storage unit configured to store first cache data; a second storage unit configured to store a cache file that stores copy of the first cache data as second cache data; a reading unit configured to select and read out one of the first cache data, which has been stored in the first storage unit, and the second cache data, which has been stored in the cache file stored in the second storage unit, in response to a reference request from outside; and an instructing unit configured to determine probability of expecting future referencing request based on the frequency of past referencing requests, the instructing unit being configured to instruct that either the first cache data or the second cache data is to be selected and read out based on the probability.

The instructing unit may be configured to calculate an average value of the past referencing requests per unit time, and to determine the probability of expecting future referencing request based on an exponential distribution taking the average value as a parameter.

The instructing unit may be configured to calculate each of the probabilities of expecting future referencing request up until a plurality of points in time and to instruct the reading unit to select and read one of the first cache data and the second cache data based on an increasing/decreasing trend of the probabilities that have been calculated.

The reading unit may be configured to delete the corresponding first cache data, which has been stored in the first storage unit, if the reading unit, based on an instruction from the instructing unit, switches from reading the first cache data stored in the first storage unit to reading the second cache data in the cache files stored in the second storage unit.

The instructing unit may be configured to calculate a probability P(t) of future referencing request expected at a time t in a future from a current point in time based on a following Equation (1):

$$P(t)=1-\exp(-\lambda \times t) \quad (1)$$

wherein an average number of past referencing events per unit time is $\lambda$.

The cache device may further include: a referencing counter configured to count the number of the referencing events during a unit of time; and an event counter configured to count the number of the referencing events in parameter unit time that is established as a time that is shorter than the unit of time.

A communication apparatus that communicates with a field device may include: a DD file holding unit configured to hold parameter property information indicating characteristics of a parameter used in the field device; and the cache device comprising: a first storage unit configured to store device property information, which is obtained from the field device and indicates characteristics of the field device, and the parameter property information, which is obtained from the DD file holding unit, as first cache data; a second storage unit configured to store a cache file that stores copy of the first cache data as second cache data; a reading unit configured to select and read out one of the first cache data, which has been stored in the first storage unit, and the second cache data, which has been stored in the cache file stored in the second storage unit, in response to a reference request from outside; and an instructing unit configured to determine probability of expecting future referencing request based on the frequency of past referencing requests, the instructing unit being configured to instruct that either the first cache data or the second cache data is to be selected and read out based on the probability.

The instructing unit may be configured to calculate an average value of the past referencing requests per unit time, and to determine the probability of expecting future referencing request based on an exponential distribution taking the average value as a parameter.

The instructing unit may be configured to calculate each of the probabilities of expecting future referencing request up until a plurality of points in time and to instruct the reading unit to select and read one of the first cache data and the second cache data based on an increasing/decreasing trend of the probabilities that have been calculated.

The reading unit is configured to delete the corresponding first cache data, which has been stored in the first storage unit, if the reading unit, based on an instruction from the instructing unit, switches from reading the first cache data stored in the first storage unit to reading the second cache data in the cache files stored in the second storage unit.

The instructing unit may be configured to calculate a probability P(t) of future referencing request expected at a time t in a future from a current point in time based on a following Equation (1):

$$P(t)=1-\exp(-\lambda \times t) \quad (1)$$

wherein an average number of past referencing events per unit time is $\lambda$.

The cache device may further include: a referencing counter configured to count the number of the referencing events during a unit of time; and an event counter configured to count the number of the referencing events in parameter unit time that is established as a time that is shorter than the unit of time.

The communication apparatus may further include: a queue processor including a FIFO memory. The instructing unit may be configured to set the parameter unit time as a time during which a read request or a write request, which is sent once from the terminal device for a purpose of referencing the parameters of the field device, is held in the FIFO memory.

The communication apparatus may further include: a communication processor. If there is a request for reading or writing of the parameters of the field device from outside, then the communication processor may obtain each of the device property information and the parameter property information, which are required for execution of processing in response to the request, from the field device and the DD file holding unit, respectively, and perform processing for writing the device property information and the parameter property information as cache data into the cache device. If the same request occurs again, then the communication processor may perform processing for reading of the device property information and the parameter property information that are held as the cache data in the cache device.

A computer program product embodied on a non-transitory computer readable medium may include: instructions to store first cache data in first storage means; instructions to store a cache file that stores copy of the first cache data as second cache data in second storage means; instructions to select and read out one of the first cache data, which has been stored in the first storage means, and the second cache data, which has been stored in the cache file stored in the second storage means, in response to a reference request from outside; and instructions to determine probability of expecting future referencing request based on the frequency of past referencing requests and to instruct that either the first cache data or the second cache data is to be selected and read out based on the probability.

The computer program product may further include: instructions to calculate an average value of the past referencing requests per unit time, and to determine the probability of expecting future referencing request based on an exponential distribution taking the average value as a parameter.

The computer program product may further include: instructions to calculate each of the probabilities of expecting future referencing request up until a plurality of points in time and to instruct the reading unit to select and read one of the first cache data and the second cache data based on an increasing/decreasing trend of the probabilities that have been calculated.

The computer program product may further include: instructions to delete the corresponding first cache data, which has been stored in the first storage unit, if the reading unit, based on an instruction from the instructing unit, switches from reading the first cache data stored in the first storage unit to reading the second cache data in the cache files stored in the second storage unit.

The computer program product may further include: instructions to calculate a probability P(t) of future referencing request expected at a time t in a future from a current point in time based on a following Equation (1):

$$P(t)=1-\exp(-\lambda \times t) \quad (1)$$

wherein an average number of past referencing events per unit time is $\lambda$.

The computer program product may further include: instructions to count the number of the referencing events during a unit of time; and instructions to count the number of the referencing events in parameter unit time that is established as a time that is shorter than the unit of time.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
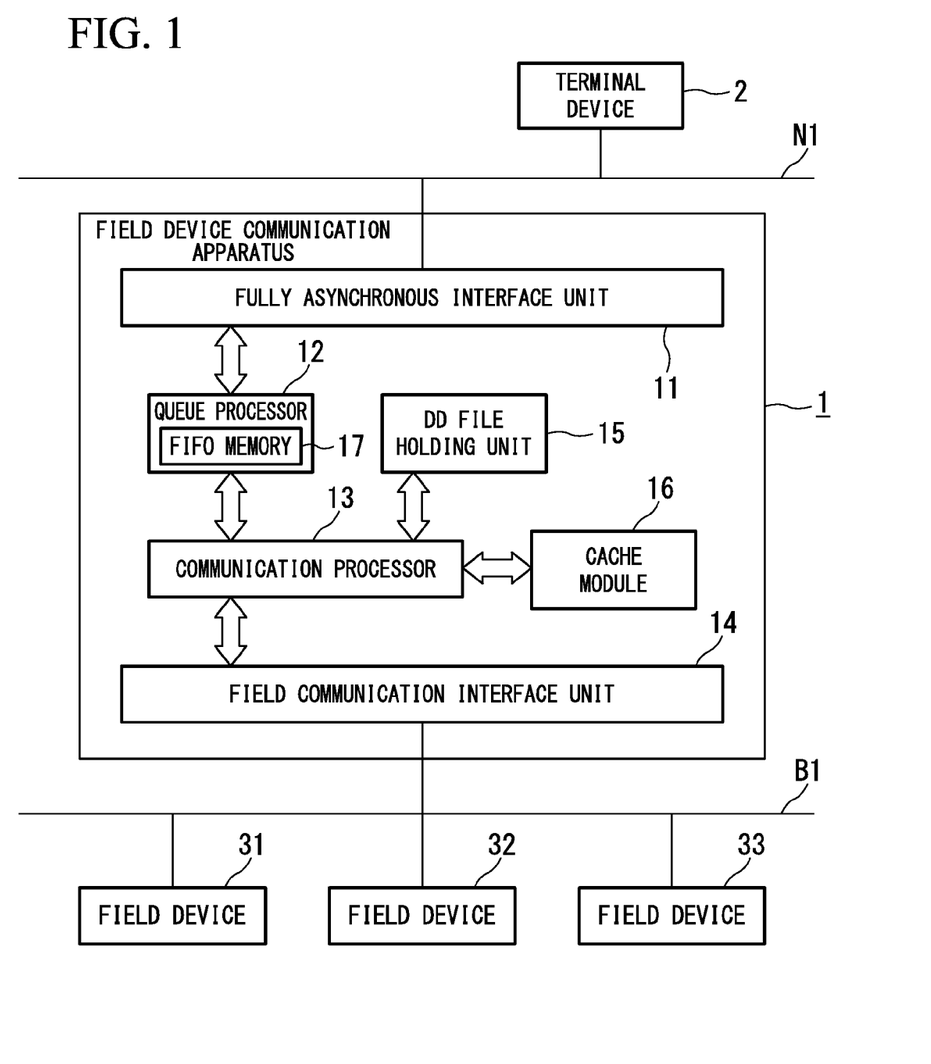
FIG. 1 is a block diagram showing a main part of a constitution of a communication apparatus in accordance with a first preferred embodiment of the present invention.

A cache device, a cache program, and a communication apparatus in accordance with a first preferred embodiment of the present invention will be described in detail below, with references made to the drawings. FIG. 1 is a block diagram showing the main part of the constitution of a communication apparatus in accordance with the first preferred embodiment of the present invention. As shown in FIG. 1, as the communication apparatus in accordance with the first preferred embodiment, a field device communication apparatus 1 is connected to a network N1 and a field bus B1. The field device communication apparatus 1 can communicate with a terminal device 2 connected to the network N1 and field devices 31, 32 and 33 connected to the field bus B1.

Although, to simplify the description, the field devices 31, 32 and 33 will be connected directly to the field bus B1, field devices 31, 32 and 33 may alternatively be connected to the field bus B1 via a controller that controls the field devices. Additionally, although in this case one terminal device 2 is directly connected to the network N1 to which the field device communication apparatus 1 is connected, the constitution of the network that connects the field device communication apparatus 1 and the terminal device 2 is arbitrary, as is the number of terminal devices 2 connected to the network N1.

The field device communication apparatus 1 has a fully asynchronous interface unit 11, a queue processor 12, a communication processor 13, a field communication interface unit 14, a DD file holding unit 15, and a cache module 16.

The DD file holding unit 15 stores a DD (device description) file created by using a DDS (data description specification). The DD file stores parameter property information indicating characteristics of a parameter used in the field devices 31, 32 and 33. The cache module 16 may hereinafter be referred to as a cache device.

The fully asynchronous interface unit 11 is connected to the network N1, and communicates asynchronously with the terminal device 2 via the network N1 therebetween. The queue processor 12 has a FIFO (first-in, first-out) memory 17. The queue processor 12 performs input/output processing of data with the fully asynchronous interface unit 11, so that asynchronous communication with the fully asynchronous interface unit 11 is performed smoothly.

The communication processor 13 controls communication performed with the terminal device 2 via the network N1, and communication performed with the field devices 31, 32 and 33 via the field bus B1. The communication processor 13 also writes data to be stored as cache data into the cache module 16, and performs processing of to retrieve cache data held in the cache module 16 as necessary.

Specifically, when there is a request for reading or writing of parameters issued to the field devices 31, 32 and 33 from the terminal device 2, the communication processor 13 obtains each of the device property information and parameter property information, which are required for execution of processing in response to the request, from the field devices 31, 32 and 33 and the DD file holding unit 15, respectively, and performs processing for writing thereof as cache data into the cache module 16. If the same request occurs again, the communication processor performs processing for the reading of device property information and parameter property information that are held as cache data in the cache module 16.

In this case, the above-noted device property information is a tag indicating the ID (identifier) or name of a field device, the internal field device calculation time period, and information indicating other characteristics of the field device. The above-noted parameter property information is one that indicates data length, sign, moniker and other characteristics of parameters used in the field device (for example, parameters into which measurement results are stored, or parameters for calculations).

The field communication interface unit 14 is connected to the field bus B1, and communicates with the field devices 31, 32 and 33 via the field bus B1. The field communication interface unit 14 can be one that performs communication conforming to a plurality of general-purpose industrial process communication protocols, such as HART (Highway Addressable Remote Transducer; registered trademark), Foundation Fieldbus (registered trademark), PROFIBUS (registered trademark), or BRAIN communication protocols.

The DD field holding unit 15 stores a DD (device description) file that is created using a DDS (data description specification) and in which the above-described parameter property information is coded. The cache module 16 is a module that holds the above-described device property information and parameter property information as cache data.

Figure 2:
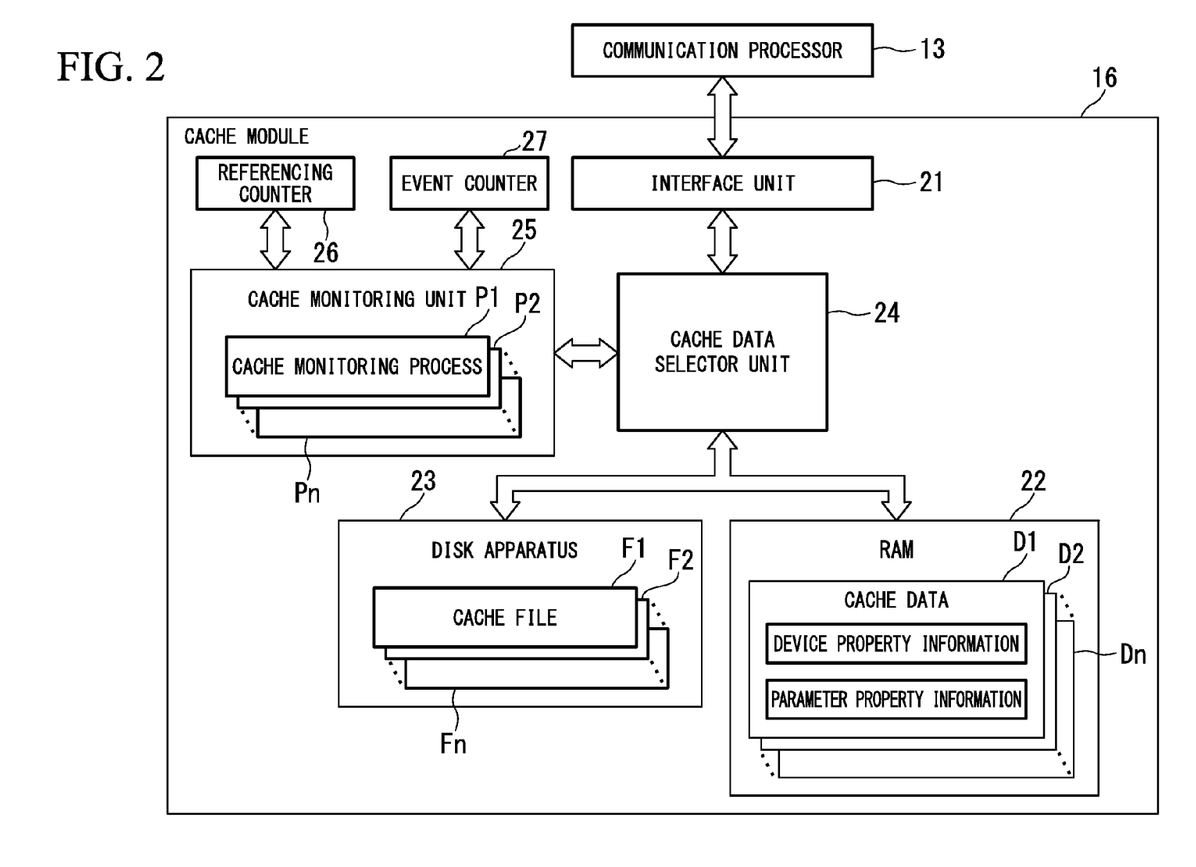
FIG. 2 is a block diagram showing main parts of a constitution of a cache device in accordance with the first preferred embodiment of the present invention.

FIG. 2 is a block diagram showing the main parts of the constitution of the cache module 16 in accordance with the first preferred embodiment of the present invention. As shown in FIG. 2, as a cache device of the first preferred embodiment, the cache module 16 has an interface unit 21, a RAM 22, a disk apparatus 23, a cache data selector unit 24, a cache monitoring unit 25, a referencing counter 26, and an event counter 27.

The RAM 22 may hereinafter be referred to as a first storage unit or first storage means. The disk apparatus 23 may hereinafter be referred to as a second storage unit or second storage means. The cache data selector unit 24 may hereinafter be referred to as a reading unit or reading means. The cache monitoring unit 25 may hereinafter be referred to as an instructing unit or instructing means.

The interface unit 21 performs input/output processing of device property information and parameter property information as cache data with the communication processor 13 provided in the field device communication apparatus 1.

The RAM 22 is a volatile memory such as, for example, a DRAM (dynamic random-access memory) that stores device property information and parameter property information from the communication processor 13 as the cache data D1 to Dn, under the control of the cache data selector unit 24.

The disk apparatus 23 is, for example, a hard disk apparatus. The disk apparatus 23 stores data that is copy of the cache data D1 to Dn in the corresponding cache files F1 to Fn, under the control of the cache data selector unit 24. Specifically, copy of the cache data D1 is stored in the cache file F1 stored in the disk apparatus 23, copy of the cache data D2 is stored in the cache file F2 stored in the disk apparatus 23, and copy of the cache data Dn is stored in the cache file Fn stored in the disk apparatus 23.

The cache data selector unit 24 writes data into the RAM 22 and the disk apparatus 23, and also reads data from the RAM 22 and the disk apparatus 23, based on instructions from the cache monitoring unit 25. Specifically, when device property information and parameter property information are input via the interface unit 21 from the communication processor 13, the cache data selector unit 24 causes the RAM 22 to store the information as the cache data D1 to Dn and also causes the cache files F1 to Fn stored in the disk apparatus 23 to store the copy of the corresponding cache data D1 to Dn. Specifically, copy of the cache data D1 is stored in the cache file F1 stored in the disk apparatus 23, copy of the cache data D2 is stored in the cache file F2 stored in the disk apparatus 23, and copy of the cache data Dn is stored in the cache file Fn stored in the disk apparatus 23.

When a referencing request for cache data held in the cache module 16, which is hereinafter referred to as a referencing event, is input from the communication processor 13, the cache data selector unit 24 makes notification to that effect, which is hereinafter referred to as a referencing event notification, to the cache monitoring unit 25. Also, when a referencing event is input from the communication processor 13, the cache data selector unit 24, based on an instruction from the cache monitoring unit 25, selects and reads one of the cache data D1 to Dn stored in the RAM 22 and the cache data in the cache files F1 to Fn stored in the disk unit 23.

When the cache data selector unit 24, based on an instruction from the cache monitoring unit 25, switches from reading the cache data stored in the RAM 22 to reading the cache data in the cache files stored in the disk apparatus 23, control is performed so as to delete the corresponding cache data that has been stored in the RAM 22. This control is done so as to effectively use the RAM 22.

The cache monitoring unit 25 monitors the frequency of referencing the cache data D1 to Dn stored in RAM 22, and instructs, using this monitor results, selection and reading of one of the cache data D1 to Dn stored in the RAM 22 and the cache data in the cache files F1 to Fn stored in the disk apparatus 23. In the cache monitoring unit 25, cache monitoring processes P1 to Pn corresponding to each of the cache data D1 to Dn stored in the RAM 22 are executed, thereby individually monitoring the cache data D1 to Dn.

Specifically, the cache monitoring unit 25 calculates the average number of past referencing event with respect to each of the cache data D1 to Dn stored in the RAM 22 per unit time, and determines, based on an exponential distribution taking the average number of times for each as a parameter, the probability of future referencing events for each of the cache data D1 to Dn. In this case, if the average number of past referencing events per unit time is $\lambda$, the probability P(t) of a referencing event expected at a time t in the future from the current point in time is given by the following Equation (1).

$$P(t)=1-\exp(-\lambda \times t) \tag{1}$$

The cache monitoring unit 25, using Equation (1), determines the each of the probabilities of expecting a future referencing event up until a plurality of points in time and, depending upon the increasing/decreasing trend of the determined probabilities, and instructs the selection and reading of one of the cache data D1 to Dn stored in the RAM 22 and the cache data in the cache files F1 to Fn stored in the disk apparatus 23. For example, if the determined probabilities are on an increasing trend, an instruction is issued so as to select and read the cache data D1 to Dn stored in the RAM 22, and if the determined probabilities are on a decreasing trend, an instruction is issued so as to select and read the cache data in the cache files F1 to Fn stored in the disk apparatus 23.

Next, the operation of the field device communication apparatus 1 in the above-noted constitution will be described. In this case, the operation for the case in which a parameter reading request is output from the terminal device 2 to the field devices 31, 32 and 33 connected to the field bus B1 will be described. To simplify the description, it will be assumed that, in the initial condition, there is no cache data held in the cache module 16.

When a parameter read request with respect to the field devices 31, 32 and 33 is output from the field device 2, the read request is transmitted via the network N1 to the field device communication apparatus 1, and is received at the fully asynchronous interface unit 11 of the field device communication apparatus 1. The read request received at the fully asynchronous interface unit 11 is input to the communication processor 13 via the queue processor 12.

When this occurs, the communication processor 13 controls the field communication interface unit 14, communicates with the field devices 31, 32 and 33 to acquire the device property information, and also interprets the DD file stored in the DD file holding unit 15 to acquire the parameter property information. Next, the communication processor 13 outputs the acquired device property information and parameter property information as cache data to the cache module 16, and makes a response to the terminal device 2 in response to the read request from the terminal device 2. This response is transmitted to the terminal device 2 via the queue processor 12 and the fully asynchronous interface unit 11.

The cache data output from the communication processor 13 is input to the cache data selector unit 24 via the interface unit 21 of the cache module 16, and is stored as cache data D1 in the RAM 22, and a cache file F1 is created in the disk apparatus 23 so as to store copy of the cache data D1. When this occurs, information indicating that cache data D1 has been stored is output from the cache data selector 24 to the cache monitoring unit 25, and the cache monitoring process P1 is executed at the cache monitoring unit 25. By doing this, the processing shown in FIG. 3 begins.

Figure 3:
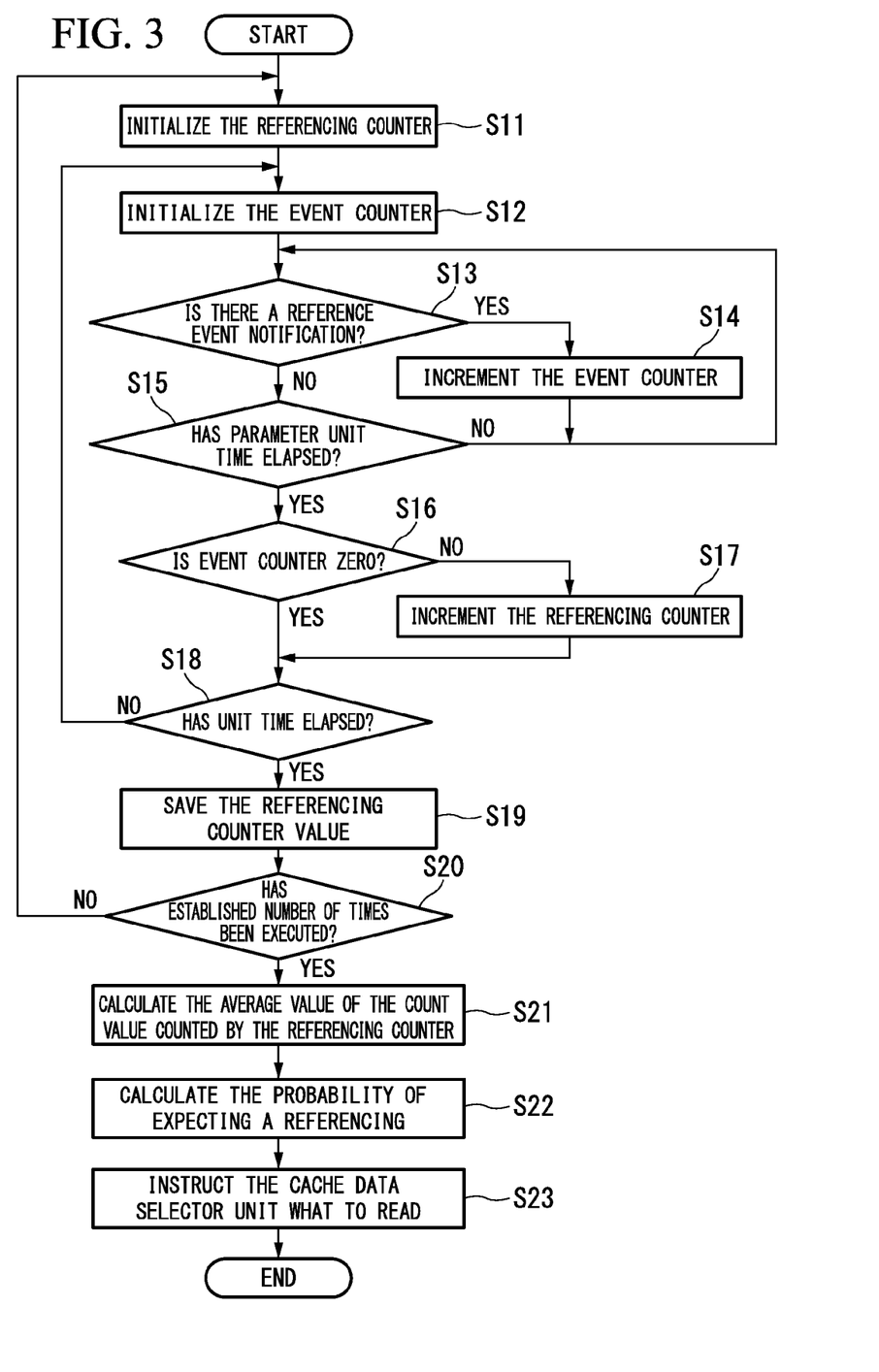
FIG. 3 is a flowchart showing an operation of a cache monitoring unit of the cache device in accordance with the first preferred embodiment of the present invention.
Figure 4:
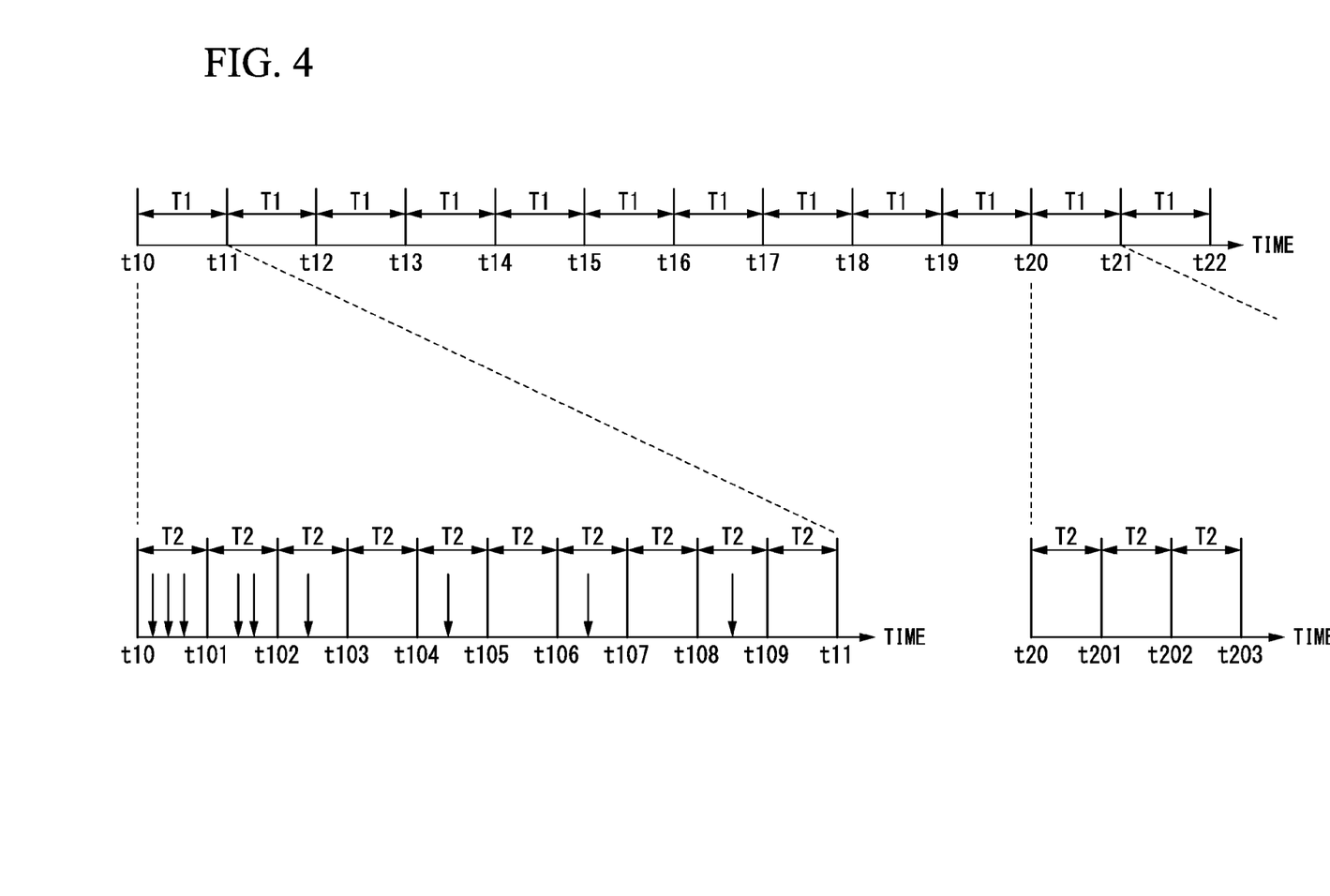
FIG. 4 is a timing diagram for describing an operation performed at the cache monitoring unit of the cache device in accordance with the first preferred embodiment of the present invention.

FIG. 3 is a flowchart showing the operation of the cache monitoring unit 25 of the cache device 16 in accordance with the first preferred embodiment of the present invention. FIG. 4 is a timing diagram for describing the operation performed at the cache monitoring unit 25 of the cache device 16 in accordance with the first preferred embodiment of the present invention. In this case, the cache monitoring unit 25 uses two counters, the referencing counter 26 and the event counter 27, for the purpose of calculating the average number of past referencing events per unit time with respect to the cache data D1 stored in the RAM 22.

The referencing counter 26 counts the number of referencing events during the above-noted unit of time. The event counter 27 counts the number of referencing events in a time that is established as a time that is shorter than the above-noted unit of time and is hereinafter referred to as a parameter unit time. The above-noted unit of time is the time T1 as shown in FIG. 4 (for example the time from time t10 to time t11), this being set to, for example, 1 second. The above-noted parameter unit time is a time T2 as shown in FIG. 4 (for example, time from time t10 to time t101), this being set to, for example, 0.1 second.

The cache monitoring unit 25 sets the above-noted parameter unit time T2, for example, as the time during which a read request or a write request, which is sent once from the terminal device 2 for the purpose of referencing a parameter of the field devices 31, 32 and 33, is held in a FIFO memory 17 provided in the queue processor 12 of the field device communication apparatus 1. The setting of this type of parameter unit time T2 and the use of an event counter that counts the number of referencing events occurring during the parameter unit time T2 are done so that, even if a plurality of referencing events occur within the parameter unit time T2, because the probability is calculated by Equation (1) based on an exponential distribution, the number of occurrences of a referencing event within the parameter unit time T2 is limited to one.

When the processing of FIG. 3 starts, the cache monitoring unit 25 first initializes the referencing counter (step S11) and then initializes the event counter (step S12). When this initialization is completed, the cache monitoring unit 25 judges whether or not there is a reference event notification from the cache data selector unit 24 (step S13). If the judgment is that there is a referencing event notification (YES judgment result), the cache monitoring unit 25 increments the event counter (step S14) and once again judges whether there is a referencing event notification (step S13).

However, if the judgment is that there is no referencing event notification (NO judgment result at step S13), the cache monitoring unit 25 judges whether or not the parameter unit time T2 has elapsed (step S15). For example, a judgment is made as to whether or not the time t101, which is a time later than the time t10 shown in FIG. 4 by the amount of the parameter unit time T2, has been reached. If the judgment is that the parameter unit time T2 has not elapsed (NO judgment result), a judgment is again made as to whether there is a referencing event notification (step S13).

If however, the judgment is made that the parameter unit time T2 has elapsed (YES judgment result at step S15), a judgment is made as to whether the value of the event counter is zero (step S16). If the judgment is that the event counter value is not zero (NO judgment result), the cache monitoring unit 25 increments the referencing counter (step S17) and judges whether the unit time T1 has elapsed (step S18). If, however, the judgment is that event counter value is zero (YES judgment result), the cache monitoring unit 25 does not increment the referencing counter and judges whether the unit time T1 has elapsed (step S18).

At step S18, a judgment is made, for example, of whether the time t11, which is a time later than the time t10 shown in FIG. 4 by the unit time T1, has been reached. If the judgment is that the unit time T1 has not elapsed (NO judgment result at step S18), the cache monitoring unit 25 initializes the event counter (step S12), and then performs referencing event monitoring in the following parameter unit time T2 (for example, in the time from time t101 to time t102) (steps S13 to S15).

If, however, the judgment is that the unit time T1 has elapsed (YES judgment result at step S18), the cache monitoring unit 25 saves the referencing counter value (step S19) and judges whether the referencing event monitoring has been executed an established number of times in the unit time T1 (step S20). For example, a judgment is made as to whether referencing event has been monitored 10 times in the unit time T1, so that referencing event monitoring has been executed for all of the unit times T1, from the time t10 to the time t20 shown in FIG. 4.

If the judgment is that the referencing event monitoring has not been executed the established number of times (NO judgment result at step S20), the cache monitoring unit 25 initializes the referencing counter and the event counter (steps S11 and S12), and then monitors referencing event in the next unit time T1 (for example, the time from time t11 until time t12 (steps S13 to S18). If, however, the judgment is made that the referencing event monitoring has been executed the established number of times (YES judgment result at step S20), the cache monitoring unit 25 calculates the average value (average number of times λ) of the count value counted by the referencing counter (step S21). Specifically, the average value of the count values of the referencing counter held at step S19 is calculated.

When the average number of times λ per unit time that referencing events have occurred in the past is calculated, the cache monitoring unit 25 uses the above-described Equation (1) to calculate the probability of a referencing event occurring up until a future point in time (step S22). For example, if the current point in time is the time t20 shown in FIG. 4, the cache monitoring unit 25 calculates the probability P(t201) of expecting a referencing event to occur from the time t20 until the time t201, which is the time that is the parameter unit time T2 thereafter, and the probability P(t202) of expecting a referencing event to occur from the time t201 until the time t202, which is the time that is the parameter unit T2 thereafter.

In this case, if the average number of times λ calculated at step S21 is 5 and the parameter unit time T2 is 0.1 [sec], the above-noted probabilities P(t201) and P(t202) are calculated as follows, using the above-described Equation (1).

$$P(t201)=1-\exp(-0.5)=0.39$$

$$P(t202)=1-\exp(-1)=0.63$$

In this case, if the case of a calculated probability of below 0.5 (50%) is taken as meaning that there is no expectation of a referencing event occurring, and the case of a calculated probability of at least 0.5 (50%) is taken as meaning that there is an expectation of a referencing event occurring, it can be said that there is no expectation of a referencing event occurring from time t20 until time t201, while there is an expectation of a referencing event occurring from time t20 until time t202.

When the above processing is completed, the cache monitoring unit 25, based on the calculated probabilities, instructs the cache data selector unit 24 of whether to select and read the cache data D1 stored in the RAM 22 or the cache data in the cache file F1 stored in the disk apparatus 23 (step S23). For example, in the above-noted example, because there is no expectation of a referencing event occurring in the time from time t20 until time t201, but there is an expectation of a referencing event occurring in the time from time t20 until time t202, the cache monitoring unit 25 instructs the reading of the cache data D1 stored in the RAM 22.

In this case, if the probability P(t203) of expecting a referencing event in the time from time t20 until time t203 shown in FIG. 4 is less than 0.5 (50%), the cache monitoring unit 25 instructs reading of the cache data in the cache file F1 stored in the disk apparatus 23. Also, if reading of the cache data D1 stored in the RAM 22 is switched to reading of the cache data in the cache file F1 stored in the disk apparatus 23, the cache data D1 stored in the RAM 22 is deleted by the cache data selector unit 24.

If the referencing event probability again rises to at least 0.5 (50%) subsequent to the above-noted switching, the cache monitoring unit 25 instructs the reading of the cache data D1 stored in the RAM 22. When this is done, the cache data selector unit 24 stores the cache data, which has been stored in the cache file F1 in the disk apparatus 23, into the RAM 22 as cache data D1.

As described above, in the first preferred embodiment, in addition to storing cash data in the RAM 22, storing is done into the disk apparatus 23 as cache data in a cache file, the probability of expecting a future referencing request being determined in accordance with the past frequency of requests to reference cache data, and reading being done, based on that probability, of either the cache data in the RAM or the cache data in the cache file in the disk apparatus. For this reason, in addition to enabling effective use of memory, it is possible to increase the number of connectable field devices without expanding memory.

Although the foregoing has been a description of a cache device and a communication apparatus in accordance with the preferred embodiment of the present invention, the present invention is not restricted to the above-described preferred embodiment, and can be subject to various modifications, within the scope thereof. For example, although in the above-described preferred embodiment the description is for the case in the cache module 16 is incorporated as a cache device within the field device communication apparatus 1, it is possible to implement the cache module 16 as a standalone device.

Additionally, it is desirable to store information used in the cache module 16 as the cache device (for example, information that sets forth the unit time T1, the parameter unit time T2 and the like) into a setting file, and to make the contents of the setting file changeable by editing.

Also, the functionality of the cache module 16 as the cache device may be implemented by hardware, or implemented in a software manner. That is, a program that implements the functionality of the cache module 16 can be installed into a computer, thereby enabling the software-like implementation of the functionality of the cache module 16. The program that implements the functionality of the cache module 16 may be stored on a recording medium such as a CD-ROM, and may also be downloaded from a network such as the Internet.

The preferred embodiment of the present invention enables effective use of memory, and provides a cache device, a cache program, and a communication apparatus that enable an increase in the number of field devices that can be connected, without memory expansion.

According to the preferred embodiment of the present invention, the probability of expecting a future referencing request is determined in accordance with the frequency of past referencing requests and, in accordance with that probability, either cache data stored in a first storage unit (RAM) or a cache data in the cache file stored in a second storage unit (disk apparatus) is selected and read out, thereby enabling effective use of memory. By doing this, it is possible to increase the number of connectable field devices without increasing the memory.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A cache device comprising:
a first storage unit configured to store first cache data;
a second storage unit configured to store a cache file that stores copy of the first cache data as second cache data;
a reading unit configured to select and read out one of the first cache data, which has been stored in the first storage unit, and the second cache data, which has been stored in the cache file stored in the second storage unit, in response to a reference request from outside; and
an instructing unit configured to determine probability of expecting future referencing request based on the frequency of past referencing requests, the instructing unit being configured to instruct that either the first cache data or the second cache data is to be selected and read out based on the probability, the instructing unit being configured to calculate a probability P(t) of future referencing request expected at a time t in a future from a current point in time based on a following Equation (1):

$$P(t)=1-\exp(-\lambda \times t) \qquad (1)$$

wherein an average number of past referencing events per unit time is $\lambda$.

2. The cache device according to claim 1, wherein the instructing unit is configured to calculate an average value of the past referencing requests per unit time, and to determine the probability of expecting future referencing request based on an exponential distribution taking the average value as a parameter.

3. The cache device according to claim 1, wherein the instructing unit is configured to calculate each of the probabilities of expecting future referencing request up until a plurality of points in time and to instruct the reading unit to select and read one of the first cache data and the second cache data based on an increasing/decreasing trend of the probabilities that have been calculated.

4. The cache device according to claim 1, wherein, the reading unit is configured to delete the corresponding first cache data, which has been stored in the first storage unit, if the reading unit, based on an instruction from the instructing unit, switches from reading the first cache data stored in the first storage unit to reading the second cache data in the cache files stored in the second storage unit.

5. The cache device according to claim 1, further comprising:
a referencing counter configured to count the number of the referencing events during a unit of time; and
an event counter configured to count the number of the referencing events in parameter unit time that is established as a time that is shorter than the unit of time.

6. A communication apparatus that communicates with a field device; the communication apparatus comprising:
a device description file holding unit configured to hold parameter property information indicating characteristics of a parameter used in the field device; and a cache device comprising:
  a first storage unit configured to store device property information, which is obtained from the field device and indicates characteristics of the field device, and the parameter property information, which is obtained from the device description file holding unit, as first cache data;
  a second storage unit configured to store a cache file that stores copy of the first cache data as second cache data;
  a reading unit configured to select and read out one of the first cache data, which has been stored in the first storage unit, and the second cache data, which has been stored in the cache file stored in the second storage unit, in response to a reference request from outside; and
  an instructing unit configured to determine probability of expecting future referencing request based on the frequency of past referencing requests, the instructing unit being configured to instruct that either the first cache data or the second cache data is to be selected and read out based on the probability, the instructing unit being configured to calculate a probability P(t) of future referencing request expected at a time t in a future from a current point in time based on a following Equation (1):

$$P(t)=1-\exp(-\lambda \times t) \tag{1}$$

wherein an average number of past referencing events per unit time is $\lambda$.

7. The communication apparatus according to claim 6, wherein the instructing unit is configured to calculate an average value of the past referencing requests per unit time, and to determine the probability of expecting future referencing request based on an exponential distribution taking the average value as a parameter.

8. The communication apparatus according to claim 6, wherein the instructing unit is configured to calculate each of the probabilities of expecting future referencing request up until a plurality of points in time and to instruct the reading unit to select and read one of the first cache data and the second cache data based on an increasing/decreasing trend of the probabilities that have been calculated.

9. The communication apparatus according to claim 6, wherein, the reading unit is configured to delete the corresponding first cache data, which has been stored in the first storage unit, if the reading unit, based on an instruction from the instructing unit, switches from reading the first cache data stored in the first storage unit to reading the second cache data in the cache files stored in the second storage unit.

10. The communication apparatus according to claim 6, wherein the cache device further comprises:
  a referencing counter configured to count the number of the referencing events during a unit of time; and
  an event counter configured to count the number of the referencing events in parameter unit time that is established as a time that is shorter than the unit of time.

11. The communication apparatus according to claim 10, further comprising:
  a queue processor including a FIFO memory, and wherein the instructing unit is configured to set the parameter unit time as a time during which a read request or a write request, which is sent once from outside for a purpose of referencing the parameters of the field device, is held in the FIFO memory.

12. The communication apparatus according to claim 6, further comprising:

a communication processor, wherein
  if there is a request for reading or writing of the parameters of the field device from outside, then the communication processor obtains each of the device property information and the parameter property information, which are required for execution of processing in response to the request, from the field device and the device description file holding unit, respectively, and performs processing for writing the device property information and the parameter property information as cache data into the cache device, and
  if the same request occurs again, then the communication processor performs processing for reading of the device property information and the parameter property information that are held as the cache data in the cache device.

13. A computer program product embodied on a non-transitory computer readable medium, the computer program product comprising:
  instructions to store first cache data in first storage;
  instructions to store a cache file that stores copy of the first cache data as second cache data in second storage;
  instructions to select and read out one of the first cache data, which has been stored in the first storage, and the second cache data, which has been stored in the cache file stored in the second storage, in response to a reference request from outside; and
  instructions to determine probability of expecting future referencing request based on the frequency of past referencing requests and to instruct that either the first cache data or the second cache data is to be selected and read out based on the probability,
  instructions to calculate a probability P(t) of future referencing request expected at a time t in a future from a current point in time based on a following Equation (1):

$$P(t)=1-\exp(-\lambda \times t) \tag{1}$$

wherein an average number of past referencing events per unit time is $\lambda$.

14. The computer program product according to claim 13, further comprising:
  instructions to calculate an average value of the past referencing requests per unit time, and to determine the probability of expecting future referencing request based on an exponential distribution taking the average value as a parameter.

15. The computer program product according to claim 13, further comprising:
  instructions to calculate each of the probabilities of expecting future referencing request up until a plurality of points in time and to instruct to select and read one of the first cache data and the second cache data based on an increasing/decreasing trend of the probabilities that have been calculated.

16. The computer program product according to claim 13, further comprising:
  instructions to delete the corresponding first cache data, which has been stored in the first storage, if reading the first cache data stored in the first storage is switched to reading the second cache data in the cache files stored in the second storage based on the instructions to select and read out one of the first cache data and the second cache data.

17. The computer program product according to claim 13, further comprising:
  instructions to count the number of the referencing events during a unit of time; and instructions to count the number of the referencing events in parameter unit time that is established as a time that is shorter than the unit of time.

\* \* \* \* \*